Nov. 15, 1960  F. J. MARGIDA  2,960,102
SAFETY VALVE FOR HYDRAULIC BRAKE SYSTEM
Filed Jan. 9, 1957  2 Sheets-Sheet 1

INVENTOR.
FRANK J. MARGIDA
BY *J. William Freeman*
ATTORNEY

Nov. 15, 1960 F. J. MARGIDA 2,960,102
SAFETY VALVE FOR HYDRAULIC BRAKE SYSTEM
Filed Jan. 9, 1957 2 Sheets-Sheet 2
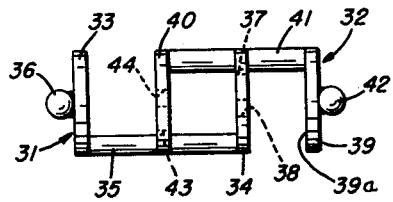
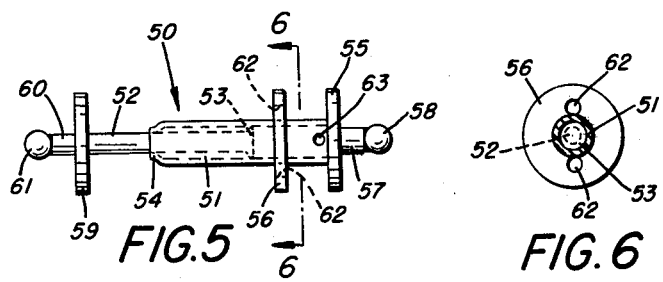
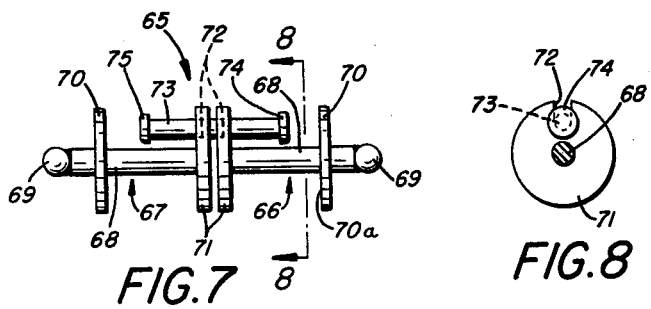
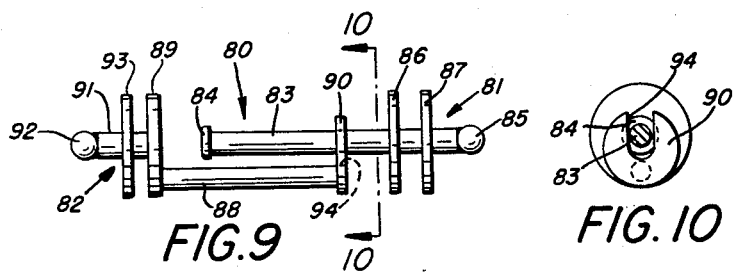
INVENTOR.
FRANK J. MARGIDA
BY *William Freeman*
ATTORNEY

United States Patent Office 2,960,102
Patented Nov. 15, 1960

2,960,102

SAFETY VALVE FOR HYDRAULIC BRAKE SYSTEM

Frank J. Margida, Akron, Ohio, assignor to Saf-T-Brake Valve Company, Inc., Akron, Ohio, a corporation of Ohio Filed Jan. 9, 1957, Ser. No. 633,244

7 Claims. (Cl. 137—119)

This invention relates to hydraulic control systems and in particular, relates to safety mechanisms for hydraulic brake systems for automobiles.

In the past, hydraulic systems have been extensively employed in connection with the braking system of an automobile. These hydraulic systems, in essence, operate to convey pressurized fluid from a central source of supply to individual pistons that are respectively provided in the individual brake drums of one or more wheels of the automobile. In this manner, the expansion of any one piston upon pressurizing of the fluid by a master cylinder for example, will cause the brake shoe to be pivoted into breaking engagement with the relatively rotatable braking surface that is provided on the wheel, and in this manner an effective and efficient braking action is obtained.

While the above type of hydraulic system has proved satisfactory in operation over the past several years it has been well known that the same is inherently dangerous in operation, in view of the fact that a single leak in any one conduit thereof can cause, in a matter of seconds, a complete loss of braking action, due to the immediate dissipation of the hydraulic brake fluid through the ruptured area. With the loss of the brake fluid as just described, depression of the brake pedal, that would normally result in subsequent actuation of the master cylinder, will merely operate to pump the pressurized brake fluid through the ruptured area; and accordingly, the individual pistons will not be supplied with the required braking fluid necessary to cause the braking action in the individual wheels. There is no warning of such loss of brake fluid; and accordingly, the operator of the automobile is first apprised of such a brake failure when he or she attempts to brake the auto by depressing the usual foot pedal.

Several proposed devices have been advanced in the past several years to provide a factor of safety against the possibility of such a brake failure as has been above described. Without exception, these structures have been of a complex, and accordingly, expensive nature, with the result that the commercial acceptance of such devices has been limited at the present time. In addition, to the cost element just discussed, the known prior art type of safety devices for hydraulic brake systems, are further disadvantageous in that the inherent complexity of the same defeats the ultimate purpose thereof, in view of the fact that the purported safety devices are so delicate that the mechanisms thereof are invariably jarred or otherwise disturbed so as to be inoperative at such time as needed. Thus, while the prior art devices may be operable upon initial installation, a brake failure might not occur for several months, and during this period in which the hydraulic brake system was operating satisfactorily, the delicate mechanism of the known prior art would be jarred or otherwise rendered inoperable, with the result that at such time as a brake failure did occur, the alleged safety device would be unable to operate to avoid the consequences of such a failure.

In co-pending application, Serial No. 477,668, filed December 27, 1954, now U.S. Patent No. 2,854,016, by Frank J. Margida, there is disclosed and claimed a safety mechanism for hydraulic brake systems for automobiles wherein a safety valve is inserted in the hydraulic system so as to be operated to terminate fluid leakage upon the breaking of any individual line or conduit which is a part of the hydraulic system. Pressure-responsive discs within the valve operate to move a ball plug into the opening of the damaged line or conduit, thereby preventing fluid drain of the hydraulic system which results in the retention of effective braking action despite the rupture in the hydraulic system.

While the subject matter of the above referred-to application has been found to be satisfactory, it has been discovered that improved results can be obtained if certain inherent structural characteristics of the same are modified to lessen the time lapse that occurs between the rupture and the positioning of the ball plug into the opening of the damaged line or conduit.

Specifically, it has been disclosed in the above co-pending application that if a pair of spaced discs are connected by a common shaft within the main valve bore, that the same, in their axial movement with respect to the valve bore, will move in unison and result in the trailing disc operating as a "drag" impeding the progress of the leading disc as it guides the ball or valve plug to the opening of the damaged line or conduit. It has since been discovered that if the two discs were not connected by a common shaft they would move not only axially of the main valve bore but also axially with respect to each other, resulting in the elimination of the "drag" previously described, thereby greatly reducing the time lapse between the rupture and the effective sealing off by the ball or valve plug.

Accordingly, it is one object of this invention to provide a safety device for hydraulic control systems having rapid and effective operation following a rupture.

tI is a further object of this invention to provide a safety device for hydraulic control systems that includes a minimum number of component parts, and is accordingly efficient in operation and maintenance.

It is still a further object of this invention to provide a low-cost safety device for the hydraulic braking systems of automobiles that is characterized by the absence of delicate adjustment parts with the result that the operation thereof is extremely simple and efficient.

It is a still further object of this invention to provide a safety device for hydraulic braking systems that will automatically resume its position after the rupture in the hydraulic fluid line has been repaired; and accordingly, does not involve a resetting operation.

These and other objects of the invention will become more apparent upon a reading of the following brief specification, considered and interpreted in the light of the accompanying drawings.

Of the drawings:

Figure 4 is an elevational view of the valving element in partially opened position.

Figure 5 is an elevational view of a modified form of the valving element.

Figure 6 is a view taken on lines 6, 6 of Figure 5.

Figure 7 is an elevational view of another modified form of the valving element.

Figure 8 is a view taken along the lines 8, 8 of Figure 7.

Figure 9 is a plan view of still another modified form of the valving element.

Figure 10 is a view taken on the lines 10, 10 of Figure 9.

Figure 1:
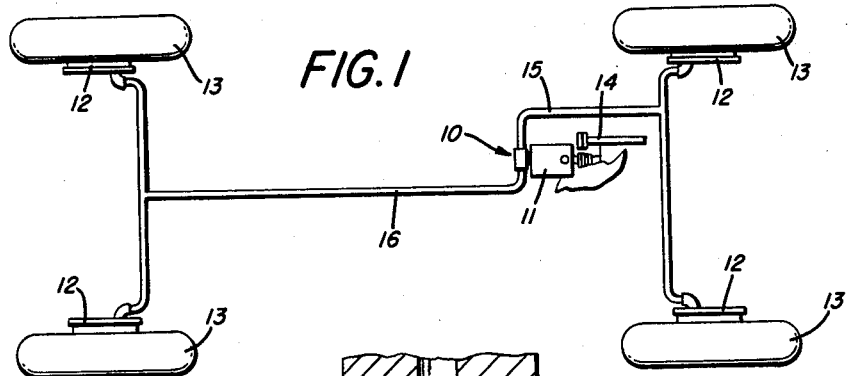
Figure 1 is a plan view illustrating schematically a hydraulic braking system for automobiles that is equipped with the improved safety device of this invention.

Referring now to the drawings, and in particular to Figure 1 thereof, the improved safety device, generally designated as numeral 10, is illustrated as being positioned to prevent the loss of braking fluid between a master cylinder 11 and a plurality of brake drums 12, 12 that are provided on wheels 13, 13; the usual foot pedal 14 being employed to actuate the master cylinder 11. Accordingly, the safety device 10 is shown positioned so as to interconnect the master cylinder 11 and the fluid lines 15 and 16 that respectively lead towards the front and rear wheel braking systems of the automobile.

Figure 2:
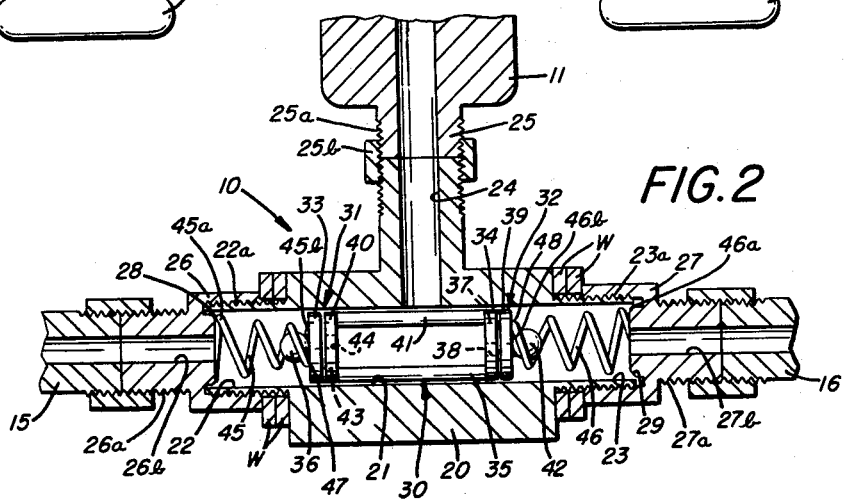
Figure 2 is a sectional view illustrating the position of the component parts of a preferred embodiment of the safety device in its normal position of use.
Figure 3:
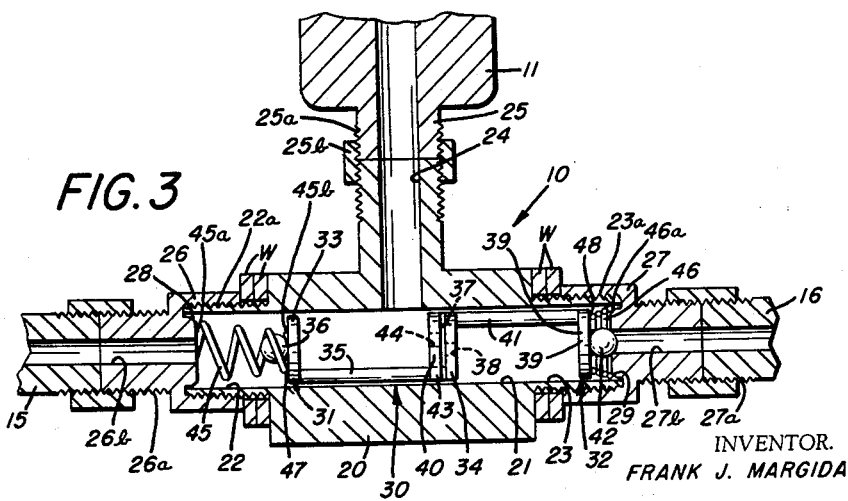
Figure 3 is a view similar to Figure 2, but illustrating the position of the component parts when a failure has occurred in one brake line.

As best illustrated in Figures 2 and 3 of the drawings, the safety device 10 includes a T-shaped valve body 20 that has an axial bore 21 thereof interconnecting the axially spaced ends 22 and 23 thereof, while a second bore 24 interconnects the bore 21 with a valve end 25 that is externally threaded as at 25a for reception of the usual fitting 25b that interconnects the valve end 25 with the master cylinder 11. By like token, the valve ends 22 and 23 are shown exteriorly threaded as at 22a, 23a, to permit respective reception thereon of cap members 26 and 27; the usual packing washers W, W being employed to prevent leakage between the just-described parts. Each cap 26, 27, in addition to including external threads 26a, 27a, is further defined by axial bores 26b, 27b that are axially concentric with the main axial bore 21 of the valve body 20. Additionally, the caps 26 and 27 further include annular seats 28, 29 respectively, that are provided for coaction with a valving element 30, in a manner to be described.

The valving element 30, as is best shown in Figure 4, includes a pair of telescoped piston members 31 and 32 that are disposed axially of bore 21 for relative axial movement therewith. Because the members 31 and 32 are identical and complementary, they will be separately described, followed by a description of their interconnection for usage.

Accordingly, the piston member 31 is shown defined by a pair of axially spaced discs 33 and 34 that are interconnected by a shaft 35, the arrangement being such that the shaft 35 connects with the discs 33 and 34 adjacent a peripheral edge thereof so as to be offset with respect to the axes thereof. In this manner, an eccentric arrangement is provided that will permit telescoping with the remaining member 32 as will presently be described.

To this end the disc 34 includes a radially extending slot 37 that is designed to slidingly receive shaft 41, while a ball or valve plug 36 and an aperture 38 are disposed adjacent the center of the leading or pressure-responsive disc 33 and the trailing disc 34 respectively, as shown best in Figure 4.

By like token, the piston member 32 includes spaced discs 39 and 40 interconnected by offset shaft 41 with the leading or pressure-responsive disc 39 being provided with concentric ball plug 42, while the trailing disc 40 includes a central aperture 44 as well as a radial slot 43 within which the shaft 35 can slide as shown in Figure 4.

From the above it will be apparent that the piston members 31 and 32 can be arranged in telescoped relationship by merely locating the shafts 35 and 41 in slots 43 and 37 respectively, in this manner, the discs 33 and 34 will move in unison relatively of the discs 39 and 40, while being concentric therewith, with ball plug 36 being axially adjacent seat 28 while plug 42 is disposed axially adjacent seat 29.

Additionally to the end of permitting passage of fluid between the bore 21 and the concentrically arranged discs 33, 34, 39, and 40, the external diameter of each disc is shown as being smaller than the diameter of the bore 21, with the result that clearance is provided therebetween for purposes to be described.

For the purpose of normally centering the just-described valving mechanism 30 in bore 21 so that the bore 24 communicates with an intermediate portion thereof, there is provided coil springs 45, 46 that are axially suspended within bore 21 between axially spaced points in bore 21 and opposed axial ends of the valving mechanism 30; the arrangement being such that the spring 45 has one end 45a seated on the annular seat 28 and has the opposed end 45b thereof received around the ball plug 36 as at 47, while the remaining spring 46 has one end 46a thereof seated against the annular seat 29 and has the opposite end 46b thereof positioned around the ball plug 42 so as to seat between the ball plug 42 and the disc 39 as at 48.

In this manner, the piston members 31 and 32 are tensionally centered in the bore 21.

In use or operation of the improved safety device 10, the same is first installed in the hydraulic fluid line of an automobile adjacent the master cylinder 11 as shown in Figure 1 so that the lines 15 and 16 are secured to the port ends 22 and 23 thereof respectively. In this condition, the valving element 30 is positioned as shown in Figure 2, with the discs 33, 40 being adjacent each other and the discs 34, 39 being adjacent each other, with the discs 33, 40 and 34, 39 being disposed at approximately equal distance on the opposite sides of the bore 24. During the normal operation of the hydraulic braking system, the piston members 31 and 32 will move axially of the bore 21 responsive to ordinary braking action. At no time, however, under normal operating conditions, will the piston members 31 and 32 contact the open end of the bores 26b, 27b, since the fluid in the lines 15 and 16 will resist such an occurrence and prevent full displacement action of the piston members 31 and 32. In this manner, fluid will thus be supplied under equal pressure to the lines 15 and 16 for operation of the brake drums 12, 12 under normal conditions.

However, when a failure occurs in the line 16, for example, it will immediately result in fluid being drained from this line through the ruptured area, and simultaneously with the draining of the fluid there will result a pressure drop in the line 16. As the pressure in line 16 drops, the pressure acting on the surface 39a of the disc 39 will be greater than the back pressure in line 16 that is exerted against the opposed face of disc 39. This pressure differential will cause the movement of the piston member 32 to the right of Figure 2 toward the position of Figure 3, at which time the ball plug 42 will seat on the open end of the bore 27b to thus seal off the flow of further fluid into the line 16. It is believed apparent that during this first-described movement, the piston member 32 will be enabled to move rapidly to the right because of the fact that the trailing disc 40 is provided with an aperture 44 that acts during such movement to eliminate any drag. In this position of Figure 3, the force of the fluid exerting pressure on surface 39a of the disc 39 will maintain the ball 42 in seated relationship with respect to the open end of bore 27b, the force of the spring 46 not being sufficient to overcome this pressure. However, when the line 16 has been repaired, the force of the spring 46 will return the member 32 to the position of Figure 2; at which time the line 16 may be refilled from the master cylinder 11 so that operation can be resumed until another failure occurs.

It is to be understood that during this just-described movement of the piston member 32, piston member 31 has remained in its approximate normal position of Figure 1 and will move axially of the piston member 32 and the axial bore 21 to seat on the open end of bore 26b only upon rupture in the line 15.

It will be seen from the foregoing that there has been provided a new and novel safety device for use in minimizing the dangerous effects of a brake failure resulting from rupture of a hydraulic fluid line. The particular safety device embodied has been illustrated in conjunction with the control of fluid in the lines 15 and 16; but it is to be understood that if desired, additional devices could be similarly employed to control the flow of fluid in other portions of fluid lines 15 and 16. It has also been shown how the construction of the safety device is of such a nature as to permit rapid operation due to the elimination of all drag factors.

In Figure 5, there is illustrated a modified form of the valving means 50 that discloses the use of a hollow cylindrical shaft 51 into which is telescoped a shaft 52 of smaller diameter, having a flanged end 52 which, in conjunction with the reduced diameter end 54 of shaft 51, prevents separation of the shafts 51 and 52 upon axial extension thereof. At the opposed end of shaft 51 there is secured a pressure-responsive disc 55 axially spaced from trailing disc 56 which is also secured to hollow shaft 51. An auxiliary shaft 57, positioned centrally on the opposed surface of disc 55, carries a ball plug 58, while a pressure-responsive disc 59 is secured to the opposed end of shaft 52 with auxiliary shaft 60 supporting the ball plug 61 in relation to the disc 59.

As in the preferred embodiment, the pressure differential created by a rupture in line 16 will cause the pressure-responsive disc 55 to move the shaft 51 axially until the ball plug 58 is seated in the open end of bore 27b. Ports 62, 62 on the trailing disc 56 prevent a build-up of resistance to the axial movement of the shaft 51, while bleeder hole 63 prevents unfavorable resistance buildup interiorly of the shaft 51. As before, the force of the spring 46 will unseat the ball 58 and return the shaft 51 to normal position upon repair of the rupture, while spring 45 will operate with spring 46 under normal conditions to center the valving means 50.

The modified form of the valving means 65 shown in Figures 7 and 8, is disposed in the hydraulic system as before and includes a pair of identical piston members 66 and 67, each equipped with a central shaft 68, 68, having one axial end thereof equipped with ball plug 69, the arrangement being such that the ball plugs 69, 69 seat against the open end of bores 26b, 27b when either one of the piston members 66 or 67 are shifted axially as in the case of a brake failure.

For the purpose of initiating such shifting of piston members 66, 67, each shaft 68 further includes a pair of spaced discs 70 and 71 with the disc 70 being the leading or pressure-responsive disc while the disc 71 in each case will constitute the trailing disc and will include a radial slot 72 that extends inwardly from one peripheral edge thereof.

To the end of facilitating relative axial movement between members 66 and 67 there is provided a shaft 73, having its opposed axial ends flanged as at 74 and 75, with these flanged ends being loosely positioned within the slots 72, 72 as shown in Figure 7. It is apparent that complete separation of the members 66 and 67 upon axial extension will be impossible due to the contact of the slots 72, 72 against the flanges 74 and 75.

In use or operation of this modified form of the invention, and again assuming a pressure differential created as the result of a rupture in the line 16, it is apparent that the piston member 66 will move axially due to pressure exerted on the surface 70a of the disc 70 to seat the ball plug 69 in the open end of the bore 27b. During this axial movement of the piston member 66, the trailing disc 71 will move axially of the shaft 73 by virtue of the loose engagement between the shaft 73 and the slot 72, with drag being eliminated by virtue of the slot 72 and to this end the depth of the slot 72 is illustrated as exceeding the diameter of the shaft 73 so as to provide a clearance for fluid flow and prevent the trailing disc 71 from resisting the axial movement of the disc 70. Again, the force of the spring 46 returns the shaft 68 to normal position upon repair of the rupture, while spring 45 normally coacts with spring 46 to center the mechanism 65.

The modifications shown in Figures 9 and 10 shows a valving mechanism 80 disposed in the hydraulic brake line of a car. The mechanism 80 includes two coacting piston members 81 and 82, with member 81 being defined by a shaft 83 that is equipped with a small diameter flange 84 at one axial end. A ball plug 85 is provided at the opposed axial end of shaft 83 while a pair of pressure-responsive discs 86 and 87 are secured to the shaft 83 in axially spaced relationship as shown in Figure 9.

For the purpose of complementally engaging the member 81, the piston member 82 includes an axially offset shaft 88 which has secured to one axial end thereof a pressure-responsive or leading disc 89 with a trailing disc 90, of smaller diameter being secured to the opposed axial end thereof. An auxiliary shaft 91 carries, at one axial end thereof, a ball plug 92 while the opposed axial end thereof is secured to the free surface of disc 89. A pressure-responsive disc 93 is secured to the shaftt 91 so as to be axially spaced with respect to the disc 89 and the ball plug 92 as shown in Figure 9.

In order that the component parts might be telescoped the trailing disc 90 has a radial slot 94 at one peripheral edge thereof into which is loosely positioned the shaft 83 of piston member 81. It is therefore apparent that complete axial separation of the piston members 81 and 82 is prevented by contact between flange 84 and slot 94.

In use and operation of the valving means 80 and again assuming a pressure differential as the result of a break in line 16, the piston member 81 will move axially to the right of Figure 9 due to the force applied against the pressure-responsive discs 86 and 87 with the result that the ball plug 85 will seat against the open end of the bore 27b until return to normal position by spring 46 on repair of the rupture.

It is to be understood that the modified valving mechanism 50, 65, and 80 bear the same relation to the valve body 20 and the component parts thereof as does the preferred valving mechanism 30. All description pointing out the relationship of the valving means 30 to the valve body 20 and its component parts apply equally to the relationship between the modified valving means 50, 65 and 80, and the valve body 20. The modifications are in the valving mechanism per se, as is clearly evident in the individual descriptions.

It will be further noted that in each case the extent of axial separation is controlled to thus obviate the possibility that both valve plugs would seat simultaneously to thus shut off the entire system. Such a happening would be highly undesirable and accordingly, the preventive measures employed herein contribute to the overall desirability of the invention.

It is also to be further understood that while the ball valves have been described as seating on the open end of the outlet bores and held thereby differences in pressure occurring as a result of a rupture in one of the lines, it is within the purview of this invention to make the diameter of the bore opening so that the ball valve will, in effect, become "locked" into the bore opening where it will remain until dislodged by the application of outside force.

Also, while the operation of the invention has been described in connection with a hydraulic system having a normal balance of fluid and the loss of such fluid through a ruptured line, it is to be understood that the piston members of each valving mechanism described may move axially of each other to displace fluid in accordance with the amount of fluid in the line that is associated therewith. Such a decreased amount of fluid may be due to evaporation or other leakage short of a rupture that results in the unbalance of the system with respect to one line thereof.

While a detailed description of this invention has been given in compliance with the patent statutes, it is to be understood that other modifications may be resorted to without departing from the spirit hereof or the scope of the appended claims.

What is claimed is:

1. A control valve of the character described, comprising; a housing defined by an axial bore having opposed outlet parts and a central inlet port; a pair of piston members, including concentric piston heads disposed in parallelism and having axially projecting piston rods that are being received in said bore in axially shiftable relationship with each other and said passage; a ball plug provided at one axial end of each said piston member; said piston head carried by each said piston member being spaced inwardly of said ball plug adjacent one axial end of each said piston member, and a pair of spring members respectively interposed between each said outlet port and each said ball plug whereby said piston members are normally centered axially of said bore; said piston having a smaller diameter than said bore whereby fluid from said inlet port may flow past the peripheral edges of said piston.

2. The device of claim 1 further characterized by the fact that each said piston member further includes an axially spaced disc concentrically arranged upon a radially offset shaft; said disc having at least one through opening therein; said opening of one said piston receiving the shaft of the opposed piston member whereby the same are telescoped.

3. The device of claim 2 further characterized by the fact that at least one of said discs includes a second through aperture.

4. The device of claim 1 further characterized by the fact that one said piston rod is hollow whereby the piston rod of the remaining piston member may be concentrically telescoped.

5. A valving mechanism for use in combination with a valve body having an axial bore defined at its opposed ends by valve seats, comprising; a pair of piston members including concentric piston heads disposed in parallelism and having axially projecting telescoped piston rods that are movable relatively of each other and said axial bore; a valve plug disposed adjacent the outermost axial end of said telescoped piston members; and means for limiting the extent of axial separation between said piston rods whereby only one said plug can be seated on the adjacent valve seat at any one time.

6. A control valve of the character described, comprising; a valve body having a main axial passage therethrough defined by port openings provided adjacent the opposed axial end thereof and having a second auxiliary passage interconnecting said main passage adjacent the central portion thereof; a pair of concentric piston heads received in said main axial passage in axially shiftable relationship therewith; valve plugs projecting axially from said heads towards said port openings and being adapted to seat thereagainst to seal the same; at least one piston rod interconnecting said piston heads and permitting relative axial movement therebetween while retaining the same in concentricity with each other; and means for limiting the extent of axial separation between said piston heads whereby only one said valve plug may be seated at any one time.

7. The device of claim 6 further characterized by the presence of spring members interposed between each said plug and the port opening adjacent thereto, whereby said piston heads are normally centered in said main axial passage.

References Cited in the file of this patent

UNITED STATES PATENTS

| | | |
|---|---|---|
| 2,231,942 | O'Dowd | Feb. 18, 1941 |
| 2,844,159 | Trethewey | July 22, 1958 |
| 2,854,016 | Margida | Sept. 30, 1958 |